(12) United States Patent
Novikov et al.

(10) Patent No.: US 12,705,798 B2
(45) Date of Patent: Aug. 11, 2026

(54) IMAGE DATA PROCESSING

(71) Applicant: Arm Limited, Cambridge (GB)

(72) Inventors: Maxim Novikov, Manchester (GB); Liam O'Neil, Manchester (GB); Yanxiang Wang, Manchester (GB); Joshua James Sowerby, Cambridge (GB)

(73) Assignee: Arm Limited, Cambridge (GB)

( * ) Notice: Subject to any disclaimer, the term of this patent is extended or adjusted under 35 U.S.C. 154(b) by 308 days.

(21) Appl. No.: 18/477,090

(22) Filed: Sep. 28, 2023

(65) Prior Publication Data

US 2025/0111540 A1 Apr. 3, 2025

(51) Int. Cl.

| | |
|---|---|
| ***G06T 9/00*** | (2006.01) |
| ***G06T 5/00*** | (2024.01) |
| ***G06T 5/50*** | (2006.01) |
| ***G06T 5/92*** | (2024.01) |
| ***G06T 7/11*** | (2017.01) |

(52) U.S. Cl.

CPC .................. *G06T 9/00* (2013.01); *G06T 5/50* (2013.01); *G06T 5/92* (2024.01); *G06T 7/11* (2017.01); *G06T 2207/20084* (2013.01); *G06T 2207/20221* (2013.01)

(58) Field of Classification Search

None

See application file for complete search history.

(56) References Cited

U.S. PATENT DOCUMENTS

| | | | | |
|---|---|---|---|---|
| 12,020,412 | B1 * | 6/2024 | He | G06T 5/92 |
| 2019/0370940 | A1 * | 12/2019 | Choi | G06N 3/084 |
| 2022/0180568 | A1 * | 6/2022 | Cho | G06N 3/09 |

* cited by examiner

*Primary Examiner* — Thomas D Lee

(74) *Attorney, Agent, or Firm* — EIP US LLP

(57) ABSTRACT

A method and system for processing image data having a first bit depth using at least one trained neural network configured to operate on data having a second bit depth, where the second bit depth is smaller than the first bit depth by generating a plurality of image data portions by splitting the image data. Each of the plurality of image data portions is encoded to produce a plurality of encoded image data portions having the second bit depth. The plurality of image data portions are then processed by at least one trained neural network, before being decoded and combined to produce composite image data. The composite image data is then output.

18 Claims, 5 Drawing Sheets

IMAGE DATA PROCESSING

BACKGROUND OF THE INVENTION

Field of the Invention

The present invention relates to methods and systems for processing image data, more particularly, processing image data using at least one neural network.

Description of the Related Technology

Image data can be produced using a number of different methods, such that image quality can be maximised to preserve the details captured. For example, high dynamic range image data can preserve details in dark and bright areas of an image, and therefore have an improved contrast and represent more colours than standard dynamic range image data.

Processing image data encoded in different ways can be difficult, especially when hardware and the processing methodologies used are configured to process inputs having certain characteristics, and that are encoded in a particular way. As such, it is desirable to develop processing methodologies which are capable of handling different types of image data.

SUMMARY

According to aspects of the present disclosure, there are provided methods and systems for processing image data having a first bit depth, using at least one trained neural network configured to operate on data having a second bit depth, where the second bit depth is smaller than the first bit depth.

A first method is one of processing image data having a first bit depth using at least one trained neural network configured to operate on data having a second bit depth, the second bit depth being smaller than the first bit depth, the method comprising generating a plurality of image data portions by splitting the image data; encoding each of the plurality of image data portions to produce a plurality of encoded image data portions having the second bit depth; processing, each of the plurality of encoded image data portions, wherein each encoded image data portion is processed by the at least one trained neural network; decoding the processed image data portions; producing composite image data by combining the decoded image data portions; and outputting the composite image data.

By facilitating the processing of high bit depth image data using existing neural networks and hardware configured to process smaller bit depth image data, this lower precision hardware, is able to be used to process the higher bit depth image data, minimising resources and processing complexity since specialised higher precision hardware is not required. That is existing hardware/trained neural networks may be utilized for the processing of higher bit depth image data efficiently.

Optionally, encoding each of the plurality of image data portions comprises applying, to the image data, at least one of an exposure bracketing operation or a tone mapping operation. This enables the higher bit depth image data to be encoded into the smaller bit depth image data efficiently, whilst preserving as much of the image data as possible.

The step of processing may comprise processing each encoded image data portion using a given one of a plurality of trained neural networks. By processing each image data portion with a given trained neural network, neural networks that are/have been trained for a specific purpose may be utilized for the processing of specific image data portions. The step of processing may comprise processing each encoded image data portion using a given portion of the at least one trained neural network, in such a case the neural network may be trained to perform processes on specific parts/portions of image data, and as such the processing of the overall image data may be optimized/made more efficient by using a part of the neural network on a corresponding portion of image data.

Optionally, the second bit depth is derived based on a precision associated with a processor configured to undertake at least part of the method. This ensures that the image data portions are encoded such that the bit depth of the encoded portions can be processed by the processors configured to execute the neural network(s).

Decoding the processed image data portions may comprise producing the decoded image data portions having a higher precision than the processed image data portions produced by the at least one trained neural network. This ensures that the decoded image data portions have the same or similar bit depth as the input image data.

Optionally, at least one trained neural network is trained using a given training data set. This ensures that the neural network(s) are all configured to perform the same processing task/operation.

Processing the image data may comprise using a plurality of trained neural networks, the plurality of neural networks comprising a base neural network and a plurality of residual neural networks. This enables each of the residual neural networks to be trained to perform/undertake a given processing task for a specific purpose.

Optionally, the base neural network is executed by a first processor having a first precision, and at least one of the plurality of the residual neural networks are executed by a second processor having a second precision, where the first precision is higher than the second precision. This facilitates the use of a neural network which is capable of operating on higher bit depth data, whilst still providing the ability for pre-trained/other neural networks configured/trained to undertake processing on smaller bit depth data to be used for processing the input image data.

Producing the composite image may comprise adding at least the decoded image data portions, or applying a weighted average to at least the decoded image data portions based on a property associated with the at least one trained neural network.

The method may comprise applying a processing operation to the image data to produce processed image data, and wherein producing the composite image data comprises combining at least the decoded image data portions and the processed image data. The processing operation may be an image processing operation. This enables other processing to be undertaken on the input image data, in addition to the processing undertaken by the trained neural network.

A second method is one of processing image data having a first bit depth using at least one trained neural network configured to operate on data having a second bit depth, the second bit depth being smaller than the first bit depth, the method comprising encoding the image data to produce encoded image data having the second bit depth; generating a plurality of encoded image data portions by splitting the encoded image data; processing each of the plurality of encoded image data portions, wherein each encoded image data portion is processed by the at least one trained neural network; decoding the processed image data portions; producing composite image data by combining the decoded image data portions; and outputting the composite image data.

By facilitating the processing of high bit depth image data using existing neural networks and hardware configured to process smaller bit depth image data, this lower precision hardware, is able to be used to process the higher bit depth image data, minimising resources and processing complexity since specialised higher precision hardware is not required. That is existing hardware/trained neural networks may be utilized for the processing of higher bit depth image data efficiently.

A first system is one for processing image data having a first bit depth using at least one trained neural network configured to operate on data having a second bit depth, the second bit depth being smaller than the first bit depth, the system comprising a generation module to generate a plurality of image data portions by splitting the image data; an encoding module to encode each of the plurality of image data portions to produce a plurality of encoded image data portions having the second bit depth; a neural processing module to process each of the plurality of encoded image data portions using the least one trained neural network; a decoding module to decode the processed image data portions; a combination module to produce composite image data by combining the decoded image data portions; and an output module for outputting the composite image data.

By facilitating the processing of high bit depth image data using existing neural networks and hardware configured to process smaller bit depth image data, this lower precision hardware, is able to be used to process the higher bit depth image data, minimising resources and processing complexity since specialised higher precision hardware is not required. That is existing hardware/trained neural networks may be utilized for the processing of higher bit depth image data efficiently.

The system may comprise a first processing unit comprising at least the generation module, the encoding module, the decoding module, the combination module, and the output module; and a second processing unit comprising at least the neural processing module.

Optionally, the second processing unit is a neural processing unit, and the first processing unit may be a graphics processing unit. The system may further comprise a processing module for applying a processing operation to image data to produce processed image data, and wherein the combination module produces the composite image data by combining the decoded image data portions and the processed image data.

The system may further comprise a training module to train the at least one neural network using a given training data set.

A second system is one for processing image data having a first bit depth using at least one trained neural network configured to operate on data having a second bit depth, the second bit depth being smaller than the first bit depth, the system comprising an encoding module to encode the image data to produce encoded image data having a second bit depth; a generation module to generate a plurality of encoded image data portions by splitting the encoded image data; a neural processing module to process each of the plurality of encoded image data portions, using the at least one trained neural network; a decoding module to decode the processed image data portions; a combination module to produce composite image data by combining at least the decoded image data portions; and an output module to output the composite image data.

By facilitating the processing of high bit depth image data using existing neural networks and hardware configured to process smaller bit depth image data, this lower precision hardware, is able to be used to process the higher bit depth image data, minimising resources and processing complexity since specialised higher precision hardware is not required. That is existing hardware/trained neural networks may be utilized for the processing of higher bit depth image data efficiently.

DETAILED DESCRIPTION OF CERTAIN INVENTIVE EMBODIMENTS

Image data may be encoded in a number of formats and using a number of different encoding methodologies. One such format/methodology is high dynamic range (HDR). HDR image data preserves the details in the dark and bright areas of an image in comparison to standard dynamic range (SDR) image data. Furthermore, HDR image data has improved contrast and can represent more colors than SDR image data.

Since HDR content captures more information, one of the challenges in using HDR content is precision. SDR content is commonly represented using 8 bits per pixel, however, HDR content requires more than 8 bits, for example, 10 bits, to represent the wider range and improved contrast/larger color gamut. HDR content, such as video data encoded using the BT.2100 and BT.2020 standards all require 10 or more bits to accurately represent the HDR signal without causing visible quantisation artefacts. It will be appreciated that HDR content may be represented by any number of bits not just 10 bits.

HDR content is becoming increasingly common, especially in mobile environments, and as such it is necessary to develop methods, processes, systems, and hardware to manage such content. For example, developing image signal processors, graphics processing units, and display pipelines, to facilitate improvements in visual quality that developers are seeking to take advantage of in their products.

Neural networks, such as convolutional neural networks, are now employed in image processing and computer graphics applications to add to/improve image data, therefore they may need to be adapted to take advantage of the benefits HDR image data provides. However, it is not uncommon for the neural networks, and the neural processing units, to be compatible with SDR image data (i.e., compatible with 8-bit image data) only, and without further training/adjustment they are not able to support the higher bit depth required for HDR content. As such, it is desirable to be able to utilize existing neural networks and hardware to process content with higher bit depths, such as HDR content.

Figure 1:
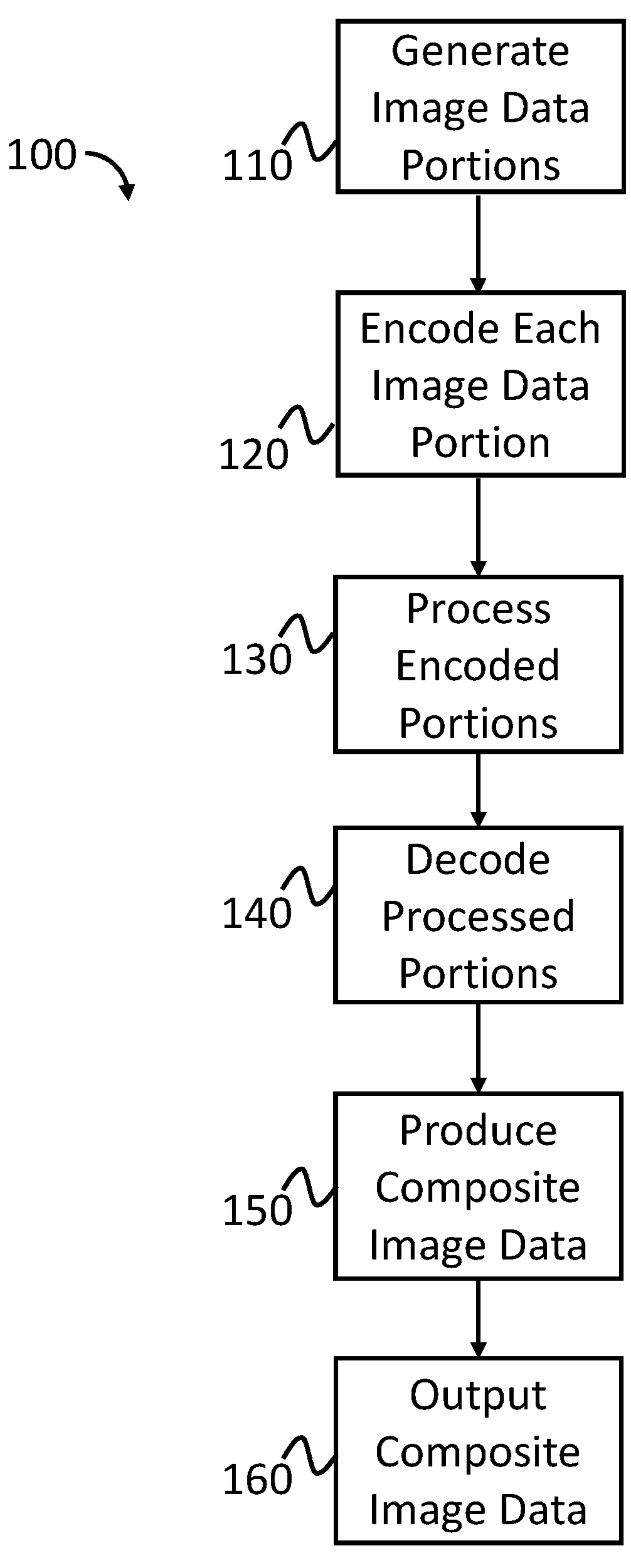
FIG. 1 is a flowchart showing a method for processing image data according to a first embodiment.

FIG. 1 is a flowchart showing a method 100 for processing image data, such as HDR content, according to a first embodiment. The flowchart of FIG. 1 represents a method 100 for processing image data having a first bit depth, using at least one trained neural network configured to operate on data having a second, smaller, bit depth. For example, the image data may be HDR image data having a bit depth of 10 bits, whereas the neural network may be configured to process image data having a bit depth of 8 bits. It will be appreciated that the image data and the neural network may have different bit depths than those set out above. The second smaller bit depth may be based on a precision associated with a processor configured to undertake at least part of the method, such as a neural processing unit configured to process the image data using the at least one neural network. It will be appreciated that in some examples, multiple smaller bit depths may be used, such as when multiple processors are used each having different precisions. At step 110, following the receipt of the image data with the first bit depth a plurality of image data portions are generated by splitting the image data. Each of the plurality of image data portions, by splitting the image data into a plurality of portions, the portions of image data are sized such that they can be more efficiently processed by the at least one trained neural network.

Following the generation of the plurality of image data portions, each of the portions is encoded to produce encoded image data portions having the second bit depth. In some examples, the image data may also be quantized or processed in other ways as part of the encoding step, such as applying a rescaling, exposure bracketing, or tone mapping operation. That is the bit depth which the at least one trained neural network is capable of processing. In some examples, encoding each of the plurality of image data portions may comprise applying one or more operations to the portions of image data, such as an exposure bracketing operation or tone mapping operation. Furthermore, in some examples, different min/max parameters may be used for each image data portion, to represent the higher bit depth image data across multiple bands.

Once each of the image data portions have been encoded, at step 130, each of the image data portions are processed by at least one neural network. In some examples, the processing of the image data portions may be undertaken by a single neural network trained using different data, and/or having different associated weights, such that each of the encoded image data portions are processed using a corresponding/specified portion of the trained neural network. In other examples, the processing of the image data portions may be undertaken by a plurality of neural networks trained using the same or different training data. It will be appreciated that a combination of these methods may be used, in particular when iterating through multiple rounds of processing as will be described in further detail below with reference to FIGS. 5A and 5B.

As set out above, the training of the neural network(s) may be based on a given training data set, however, it will be appreciated that the same neural network may be trained using different training data sets or trained using the same training data set, based on the required functionality.

In some examples, such as where there are a plurality of neural networks used to process the portions of image data, the plurality of neural networks may comprise a base neural network and one or more residual neural networks (as will be described in more detail below with reference to FIG. 2). In such examples, the base neural network may be executed by a first processor having a first precision, and at least one of the residual neural networks may be executed by a second processor having a second, lower, precision. Similarly, in some examples, the residual neural networks may be learnt jointly, such as using the same training data set, whereas the base neural network may be learnt separately and/or using a different training data set. Since the residual neural networks are learnt jointly, each residual neural network may be configured to perform different operations, such as edge processing, which can then be combined to produce an output having a higher bit depth, as will be described below with reference to step 150.

Following the processing by the at least one neural network, at step 140, the processed image data portions are decoded, by decoding the processed image data portions, they can be converted back to the higher bit depth data that was originally received. For example, the processed image data portions may have a bit depth of 8 bits (i.e., SDR image data) as that is what the processing capabilities of the hardware and is the bit depth that the neural networks were trained/adapted to operate on. Following the decoding step at 140, the portions of processed image data may have a bit depth of 10 bits (i.e., HDR image data), which matches the input image data. The decoding of the processed image data portions may be based on the operations applied and the steps taken when encoding the image data portions at step 120 (e.g., using the min/max parameters). By decoding the processed image data portions, decoded image data portions are produced having a higher precision than the processed image data portions produced by the at least one trained machine learning model.

Once the processed image data portions have been decoded, at step 150, they are combined to produce composite image data representative of the higher bit depth image data received as an input. For example, where the higher bit depth image data is HDR image data, the composite image data will be a representation of the HDR image data as it would have been processed by the at least one neural network. It will be appreciated that there are a number of methods which may be used to produce the composite image data, for example, the decoded image data portions may be added together, and/or a weighted average may be applied to at least the decoded image portions based on a properties associated with at least one of the trained neural networks. In some examples, a combination of many of the methods may be used.

In some examples, the input image data (i.e., the image data having the higher bit depth) may have additional processing applied to it, for example, a processing operation may be applied separately to any processing undertaken by the neural networks. This processing operation may operate on the high bit depth image data, and as such may be undertaken by a processor configured to operate on higher bit depth data. It will be appreciated that the processing operation may be any processing operation, and in some examples, maybe an image processing operation, and may comprise any number of different operations including but not limited to, a balancing operation, a filter, a style transfer, a denoising operation, a de-mosaicking operation, a color enhancement operation, an interpolation operation, and a resampling operation.

The output of the processing operation may then be combined, at step 150, with the decoded processed image data portions to produce the composite image data.

Once the composite image data has been produced, the composite image data may be output at step 160. The composite image data may be output to another processing module for further processing or may be output to storage or a display.

Figure 2:
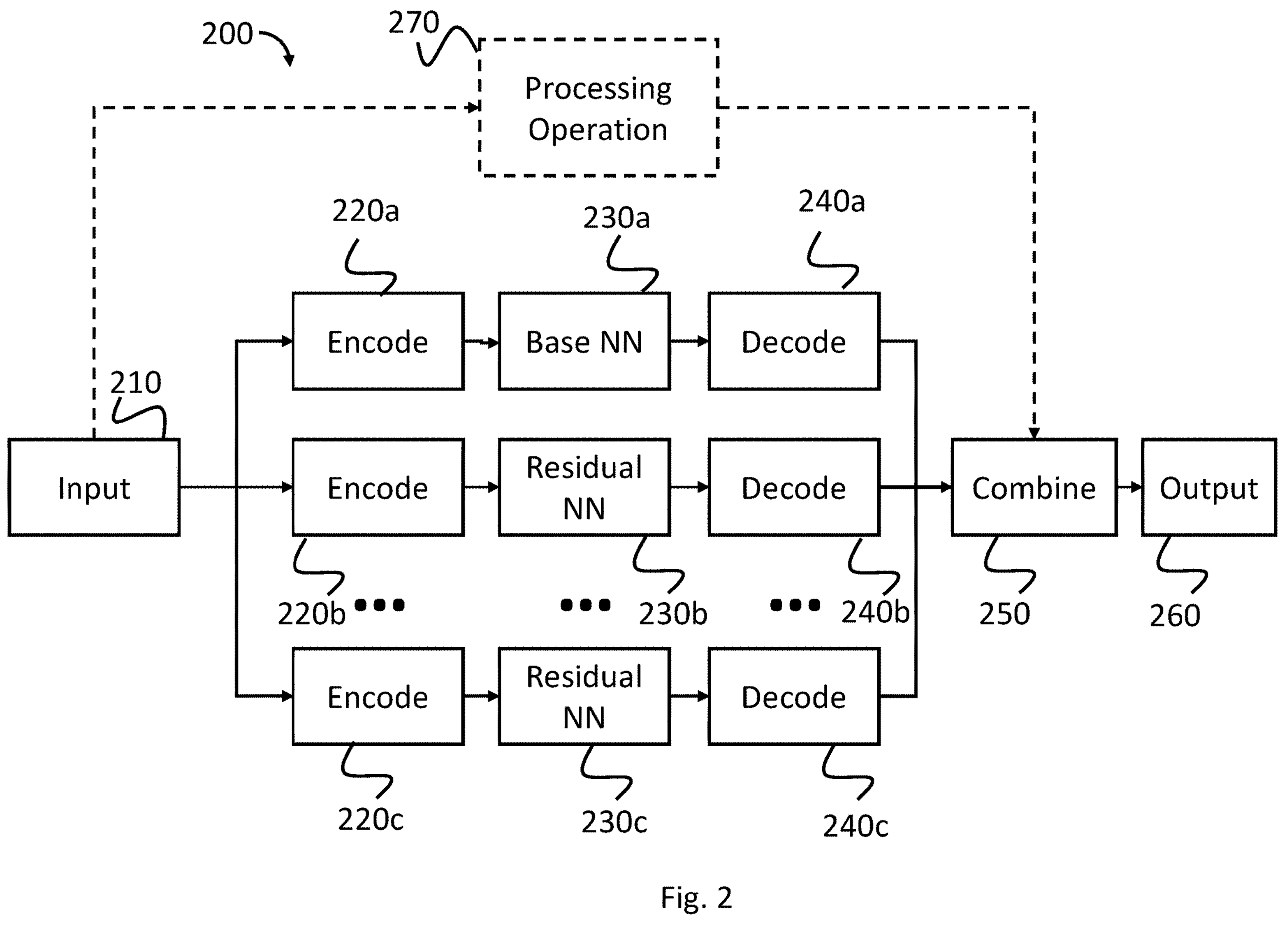
FIG. 2 is a schematic representation of the processing of the image data where portions of the image data are encoded using one or more trained neural networks according to an example.

FIG. 2 is a schematic representation 200 of the processing of the image data where portions of the image data are encoded using one or more trained neural networks according to an example. At 210 the image data is provided. As described above, the image data has a bit depth which is higher than the bit depth that the neural networks are configured to operate on. For example, the neural networks may be configured to operate on data having a bit depth of 8 bits and the input data may have a bit depth of 10 bits. It will be appreciated that other bit depths may be used and that 8 and 10 bits are merely examples. The input image data may be split into a plurality of portions such that each portion may be provided to a separate processing pipeline each configured to process a portion of the image data. Whilst only three separate processing pipelines are represented in FIG. 2, it will be appreciated that there may be more than or less than three processing pipelines.

Once the image data has been split into a plurality of portions, each portion may be processed separately by the separate processing pipelines. As described above, at first, the image data portion is encoded 220*a*, 220*b*, 220*c*, to produce encoded image data portions having a bit depth which is compatible with the bit depth of the neural network. Following the encoding of the image data portions, they are then processed by the neural networks 230*a*, 230*b*, 230*c*, such that the neural networks perform the intended operation (s) on the inputs. In some examples, at least one of the processing pipelines may comprise a base neural network 230*a*, whilst the other processing pipelines may comprise residual neural networks 230*b*, 230*c*, where the residual neural networks have been learnt jointly, and each can perform different operations. It will be appreciated that in some examples, the same neural network may be utilized for all processing pipelines, such that different portions of the neural network are used for different portions of the encoded image data. Similarly, in other examples, the same neural network may be used in all processing pipelines, but each instance of the neural network may be trained using different training data such that the weights associated with each instance are different, and as such process the encoded image data portion differently (e.g., apply different operations, etc.).

Following the processing of the encoded image data portions, the processed image data portions are decoded 240*a*, 240*b*, 240*c*, such that they represent image data having a higher bit depth (e.g., 10 bits versus 8 bits). After the decoding, the decoded, processed, image data portions are combined 250 as described above in relation to step 150, and then output 260 for further processing, storage and/or display.

In some examples, a further processing operation 270 may be performed on the whole of the image data (i.e., on the entirety of the higher bit depth image data), such as an image processing operation or any other type of operation as will be appreciated by the skilled person. The output of the processing operation 270 is then combined with the output of each of the processing pipelines, such that they are combined, and an overall output is produced.

Figure 3:
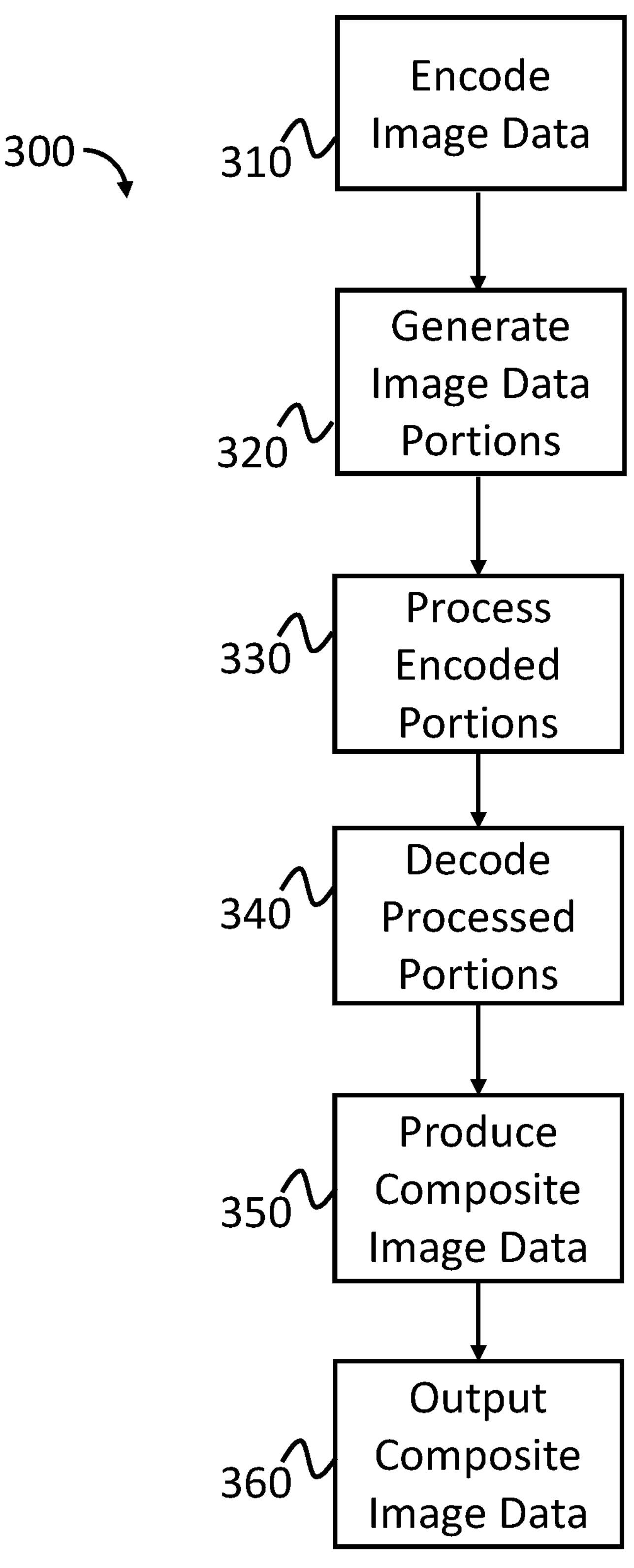
FIG. 3 is a flowchart showing a method for processing image data according to a second embodiment.

FIG. 3 is a flowchart showing a method 300 for processing image data according to a second embodiment. The majority of the method 300 corresponds with method 100, however, it processes the high bit depth image data differently. At step 310, the high bit depth image data is encoded such that the image data has a smaller bit depth which is compatible with the bit depth of the neural networks of the processing pipelines. Once the image data has been encoded at step 320 a plurality of image data portions are generated, and then each are processed using the at least one neural network at step 330. As described above in relation to method 100 of FIG. 1, following the processing of the encoded image data portions, the processed image data portions are decoded at step 340, and then combined at step 350 to produce composite image data. In some examples, at step 350, the decoded, processed image data may be combined with the output of another processing operation which has been undertaken on the high bit depth image data to produce the composite image data. The composite image data is then output at step 360 for further processing, storage and/or display.

Figure 4:
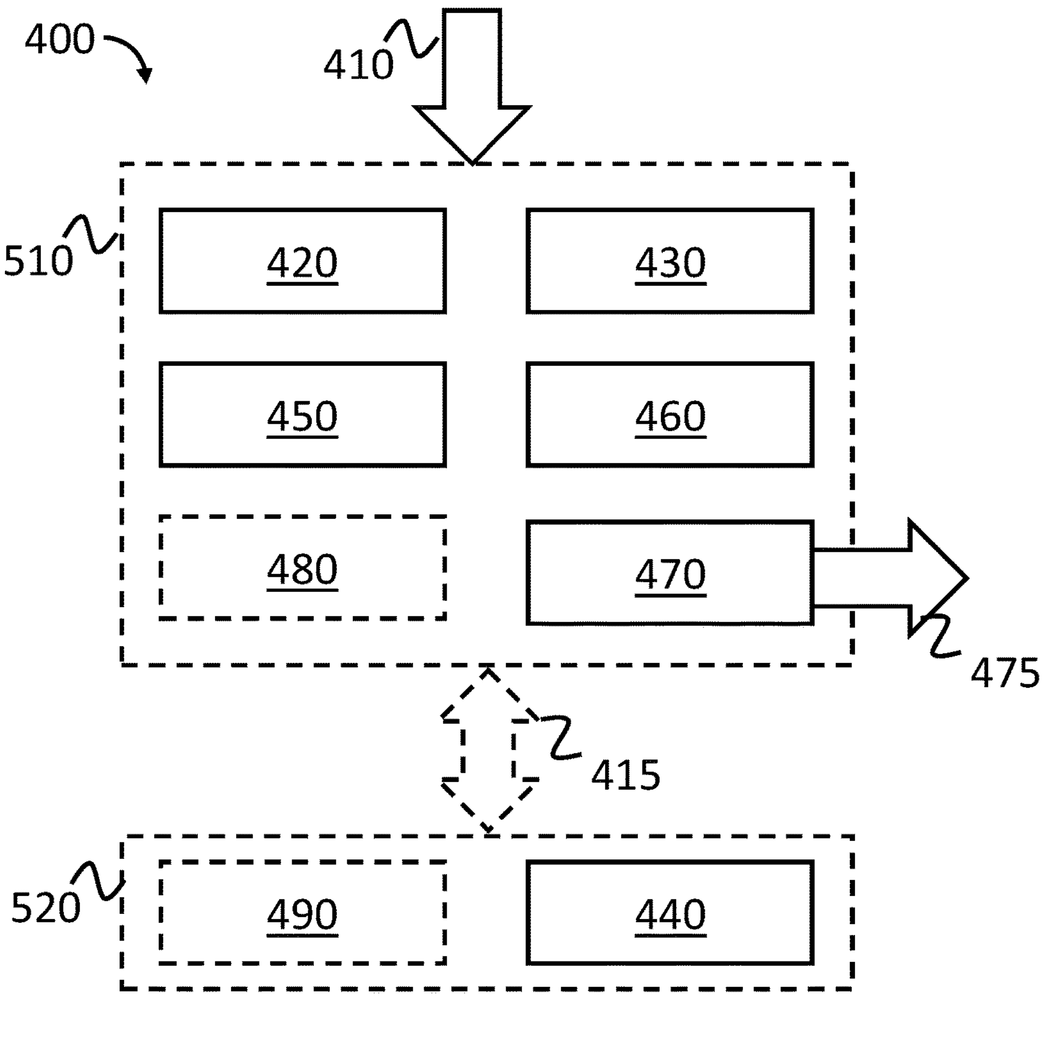
FIG. 4 is a schematic representation of a system according to an embodiment.

FIG. 4 is a schematic representation of a system 400 according to an embodiment. The system comprises at least one processor having modules 410-490 for performing the methods 100, 300 described above in relation to FIG. 1 and FIG. 3. In some examples, the modules 410-490 may be distributed amongst multiple processors 510, 520 which may be of different types. For example, the modules 420, 430, 450, 460, 470, 480 responsible for processing the image data, such as encoding, decoding, and generating the image data portions, may form part of a first processor 510 capable of operating on the higher bit depth data. It will be appreciated that the processor 510 may also be capable of operating on other bit depth data. Other modules 490, 440, such as those which are configured to execute the trained neural networks may form part of another module 520 which is capable of operating on the smaller bit depth data. At least one of the processors 510 may be a central processing unit, or any other type of processing unit, whereas the processor 520 configured to execute the neural networks may be a neural processing unit specifically configured to process data using the neural networks. In some examples, other processing units, such as an image signal processor may also be used, such as for undertaking the other processing operations discussed above in relation to FIGS. 1-3.

The system 400 also comprises memory (not shown) for storing data generated by the processor/processors 510, 520. Furthermore, in some examples, the system 400 may comprise a memory controller (not shown), which may be a dynamic memory controller (DMC). The memory controller is coupled to the memory. The memory controller is configured to manage the flow of data going to and from the memory. The memory may comprise a main memory, otherwise referred to as a 'primary memory.' The memory may be an external memory, in that the memory is external to the system 400. For example, the memory may comprise 'off-chip' memory. The memory may have a greater storage capacity than the local caches of the processors 510, 520. In some examples, the memory is comprised in the system 400. For example, the memory may comprise 'on-chip' memory. The memory may, for example, comprise a magnetic or optical disk and disk drive or a solid-state drive (SSD). In some examples, the memory comprises a synchronous dynamic random-access memory (SDRAM). For example, the memory may comprise a double data rate synchronous dynamic random-access memory (DDR-SDRAM).

One or more of the processors 510, 520 and the memory 820 may be interconnected using a system bus 415. This allows data to be transferred between the various components. The system bus 415 may be or include any suitable interface or bus. For example, an ARM® Advanced Microcontroller Bus Architecture (AMBA®) interface, such as the Advanced extensible Interface (AXI), may be used.

As described above, the system 400 comprises a number of modules for undertaking the method 100, 300 described in relation to FIGS. 1 and 3. The system 400 is arranged to receive 410 image data with a first bit depth for processing by a neural network trained to process content/image data with a second, smaller bit depth. The received image data is used by a generation module 420 to generate a plurality of image data portions by splitting the image data. Each of the image data portions may then be encoded using the encoding module 430 by quantizing the image data portion to produce a plurality of encoded image data portions having the second, smaller bit depth. In some examples, such as in method 300 described above, the encoding module 430 may be configured to encode the entirety of the higher bit depth image data to produce image data having the second, smaller bit depth, before providing the encoded image data to the generation module 420 to produce the plurality of encoded image data portions.

The system 400 also comprises a processing module 440. The processing module 440 is configured to process the encoded image data portions using at least one neural network. Each encoded image data portion may be processed by the same, or different neural networks, and in some examples where the same neural network is used, the neural network may be trained using different training data and/or have different weights depending on the portion. The neural processing module 440 may form part of a specialised processor 520, such as a neural processing unit, which is separate from the processor comprising other modules of the system 400. The specialised processor 520 may be connected to other modules of the system 400 using a bus 415 which facilitates the passing of information between the components of the system 400.

A decoding module 450 receives the processed image data portions from the neural processing module 440 and decodes the processed image data portions such that they represent the higher bit depth associated with the initial input image data 410. The decoded image data portions are then combined by a combination module 460 to produce composite image data 475 for output by an output module 470. The output module 470 may output the composite image data 475 to storage, a further processing module, and/or a display associated with the system 400.

In some examples, the system 400 comprises a processing module 480 for applying a processing operation to the input image data 410. It will be appreciated that the processing operation may be any processing operation, and in some examples, maybe an image processing operation, and may comprise any number of different operations including but not limited to, a balancing operation, a filter, a style transfer, a denoising operation, a de-mosaicking operation, a color enhancement operation, an interpolation operation, and a resampling operation. The output of the processing module 480 may be provided to the combination module 460 to be combined with the processed, and decoded, image data portions provided by the decoding module 450. The processing module 480 may form part of the same processor 510 as a number of the other modules, or in some examples may be part of a completely separate processor, such as one which is specialised for undertaking the operations the processing modules is configured to perform (e.g., an image signal processor).

In addition to a processing module 480, in some examples, the system 400 may comprise a training module 490 for training at least one of the neural networks. The training module 490 may form part of the neural processor 520, such that it is specialised and configured specifically for performing training (and execution) tasks associated with the neural networks.

Figure 5A:
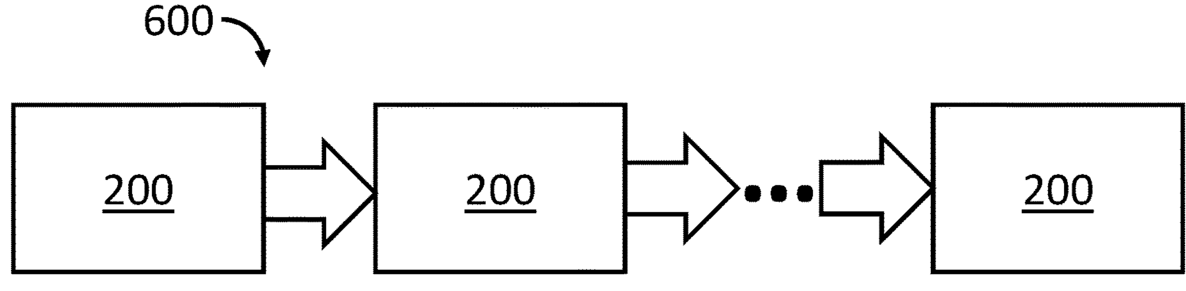
FIG. 5A is a schematic representation of the iterative processing of image data according to a first example.
Figure 5B:
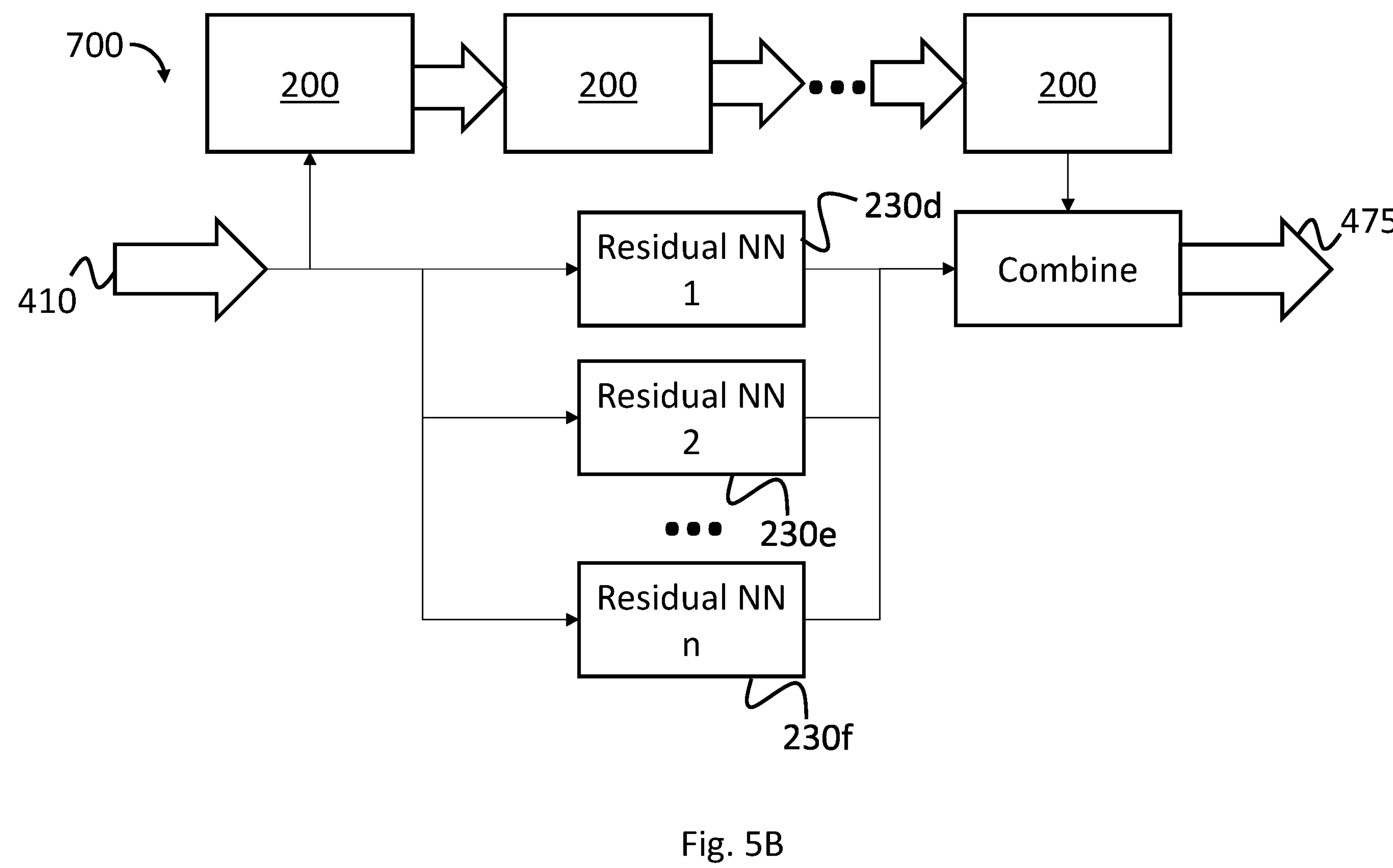
FIG. 5B is a schematic representation of the iterative processing of image data according to a second example.

FIGS. 5A and 5B show schematic representations 600, 700 of the iterative processing of image data. In FIG. 5A the representation 600 shows a plurality of applications of the methods 100, 300 described above. For example, the representation 200 described in relation to FIG. 2, of the processing undertaken in relation to methods 100, 300 may be chained together such that the output of one processing instance 200 feeds into the input of another processing instance 200. Whilst the representation 600 in FIG. 5A shows three processing instances, it will be appreciated that there may be more than or less than three instances used when performing iterative processing of the image data.

Similarly, the representation 700 shown in FIG. 5B shows the input data 410, having the higher bit depth, being provided to an iterative processing pipeline comprising a plurality of processing instances 200 as described above in relation to FIG. 5A, and to a number of other neural networks 230*d*, 230*e*, 230*f* configured to further process the input data 410. The other neural networks may also require the splitting, and encoding of the input data as described above in relation to FIGS. 1-4, however, in some examples, it will be appreciated that the neural networks (and the hardware on which they run) may be capable of processing the input data having the higher bit depth. In other examples, the method steps 110, 120, 140, 150, 160 may also be required to be performed to facilitate processing by the other neural networks 230*d*, 230*e*, 230*f*.

Once the iterative processing pipeline and the other neural networks 230*d*, 230*e*, 230*f* have processed the image data and provided an output, they may be combined 710 to produce composite image data 475 which can then be output to memory or a display, or for further processing.

At least some aspects of the examples described herein, with reference to FIGS. 1-5B, comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples of the disclosure are envisaged. It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

What is claimed is:

1. A method of processing image data having a first bit depth using at least one trained neural network configured to operate on data having a second bit depth, the second bit depth being smaller than the first bit depth, the method comprising:

generating a plurality of image data portions by splitting the image data;

encoding each of the plurality of image data portions to produce a plurality of encoded image data portions having the second bit depth;

processing, each of the plurality of encoded image data portions, wherein each encoded image data portion is processed by the at least one trained neural network;

decoding the processed image data portions;

applying a processing operation to the image data to produce processed image data;

producing composite image data by combining the decoded image data portions and the processed image data; and outputting the composite image data.

2. The method of processing image data according to claim 1, wherein encoding each of the plurality of image data portions comprises applying, to the image data, at least one of an exposure bracketing operation or a tone mapping operation.

3. The method of processing image data according to claim 1, wherein the step of processing comprises processing each encoded image data portion using a given one of a plurality of trained neural networks.

4. The method of processing image data according to claim 1, wherein the step of processing comprises processing each encoded image data portion using a given portion of the at least one trained neural network.

5. The method of processing image data according to claim 1, wherein the second bit depth is derived based on a precision associated with a processor configured to undertake at least part of the method.

6. The method of processing image data according to claim 1, wherein decoding the processed image data portions comprises producing the decoded image data portions having a higher precision than the processed image data portions produced by the at least one trained neural network.

7. The method of processing image data according to claim 1, wherein the at least one trained neural network is trained using a given training data set.

8. The method of processing image data according to claim 1, wherein processing the image data comprises using a plurality of trained neural networks, the plurality of neural networks comprising a base neural network and a plurality of residual neural networks.

9. The method of processing image data according to claim 8, wherein the base neural network is executed by a first processor having a first precision, and at least one of the plurality of the residual neural networks are executed by a second processor having a second precision, where the first precision is higher than the second precision.

10. The method of processing image data according to claim 1, wherein producing the composite image data comprises:

adding at least the decoded image data portions; or applying a weighted average to at least the decoded image data portions based on a property associated with the at least one trained neural network.

11. The method of processing image data according to claim 1, wherein the processing operation is an image processing operation.

12. A method of processing image data having a first bit depth using at least one trained neural network configured to operate on data having a second bit depth, the second bit depth being smaller than the first bit depth, the method comprising:

encoding the image data to produce encoded image data having the second bit depth;

generating a plurality of encoded image data portions by splitting the encoded image data;

processing each of the plurality of encoded image data portions, wherein each encoded image data portion is processed by the at least one trained neural network;

decoding the processed image data portions;

producing composite image data by combining the decoded image data portions; and outputting the composite image data.

13. A system for processing image data having a first bit depth using at least one trained neural network configured to operate on data having a second bit depth, the second bit depth being smaller than the first bit depth, the system comprising at least one processor to:

generate a plurality of image data portions by splitting the image data;

encode each of the plurality of image data portions to produce a plurality of encoded image data portions having the second bit depth;

process each of the plurality of encoded image data portions using the least one trained neural network;

decode the processed image data portions;

apply a processing operation to the image data to produce processed image data;

produce composite image data by combining the decoded image data portions and the processed image data; and output the composite image data.

14. The system for processing image data according to claim 13, further comprising a training module to train the at least one neural network using a given training data set.

15. The system for processing image data according to claim 13, comprising:

a first processing unit comprising at least the generation module, the encoding module, the decoding module, the combination module, and the output module; and a second processing unit comprising at least the neural processing module.

16. The system for processing image data according to claim 15, wherein the second processing unit is a neural processing unit.

17. The system for processing image data according to claim 15, wherein the first processing unit is a graphics processing unit.

18. A system for processing image data having a first bit depth using at least one trained neural network configured to operate on data having a second bit depth, the second bit depth being smaller than the first bit depth, the system comprising at least one processor to:

encode the image data to produce encoded image data having a second bit depth;

generate a plurality of encoded image data portions by splitting the encoded image data;

process each of the plurality of encoded image data portions, using the at least one trained neural network;

decode the processed image data portions;

produce composite image data by combining at least the decoded image data portions; and output the composite image data.

* * * * *